(12) United States Patent
Yoon et al.

(10) Patent No.: US 10,948,645 B2
(45) Date of Patent: *Mar. 16, 2021

(54) BACKLIGHT UNIT WITH LIGHT-MODIFYING PORTION AND DISPLAY INCLUDING THE SAME

(71) Applicant: LG Display Co., Ltd., Seoul (KR)

(72) Inventors: HyeokJoon Yoon, Paju-si (KR); KiSeong Kim, Paju-si (KR); SeungJu Gwon, Paju-si (KR); Donghwi Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/706,341

(22) Filed: Dec. 6, 2019

(65) Prior Publication Data

US 2020/0192014 A1 Jun. 18, 2020

(30) Foreign Application Priority Data

Dec. 17, 2018 (KR) .................. 10-2018-0163499
Oct. 24, 2019 (KR) .................. 10-2019-0133034

(51) Int. Cl.
*F21V 8/00* (2006.01)
*G02F 1/13357* (2006.01)
(Continued)

(52) U.S. Cl.
CPC ......... *G02B 6/0003* (2013.01); *G02B 6/0051* (2013.01); *G02B 6/0053* (2013.01);
(Continued)

(58) Field of Classification Search
CPC ......... G02F 1/133602; G02F 1/133605; G02F 1/133606; G02F 1/133609;
(Continued)

(56) References Cited

U.S. PATENT DOCUMENTS 7,816,854 B2 10/2010 Ryu et al.
7,839,468 B2 11/2010 You et al.
(Continued)

FOREIGN PATENT DOCUMENTS

EP 3012308 A1 4/2016
EP 3270037 A1 1/2018
(Continued)

OTHER PUBLICATIONS

Combined Search and Examination Report, UK Intellectual Property Office Patent Application No. GB1917838.3, dated Jun. 1, 2020, 7 pages.
(Continued)

*Primary Examiner* — Evan P Dzierzynski
*Assistant Examiner* — Keith G. Delahoussaye
(74) *Attorney, Agent, or Firm* — Fenwick & West LLP

(57) ABSTRACT

In an embodiment, a display device comprises a display panel and a backlight unit. The backlight unit comprises a substrate, phosphor film, light-emitting devices, and light-modifying portion. A part of light emitted by the light-emitting devices traveling along a first path that passes through the phosphor film and another part of the emitted light traveling along a second path that bypasses the phosphor film. The light-modifying portion is in the second path and modifies a color of the other part of the emitted light so that the modified color is closer to a color of the part of the light through the phosphor film than a color of the emitted light at the light-emitting devices.

29 Claims, 16 Drawing Sheets

(51) Int. Cl.
*G02F 1/1333* (2006.01)
*G02F 1/1335* (2006.01)

(52) U.S. Cl.
CPC ......... *G02B 6/0055* (2013.01); *G02B 6/0063* (2013.01); *G02B 6/0088* (2013.01); *G02F 1/133602* (2013.01); *G02F 1/133603* (2013.01); *G02F 1/133605* (2013.01); *G02F 1/133606* (2013.01); *G02F 1/133608* (2013.01); *G02F 1/133609* (2013.01); *G02F 1/133388* (2021.01); *G02F 1/133614* (2021.01)

(58) Field of Classification Search
CPC .......... G02F 2001/13388; G02F 2001/133614; G02B 6/0003; G02B 6/0051; G02B 6/0055; G02B 6/0088; F21K 9/61–65
See application file for complete search history.

(56) References Cited

U.S. PATENT DOCUMENTS

| | | |
|---|---|---|
| 7,884,536 B2 | 2/2011 | Lee et al. |
| 8,926,114 B2 | 1/2015 | Park et al. |
| 2007/0284998 A1 | 12/2007 | Lee et al. |
| 2008/0111952 A1 | 5/2008 | Ryu et al. |
| 2009/0061552 A1* | 3/2009 | Chang ................ B29C 45/1671 438/29 |
| 2009/0174841 A1 | 7/2009 | You et al. |
| 2011/0051412 A1* | 3/2011 | Jeong ................ G02F 1/133603 362/235 |
| 2011/0292302 A1 | 12/2011 | Park et al. |
| 2013/0308337 A1 | 11/2013 | Chang et al. |
| 2014/0319995 A1* | 10/2014 | Kim ..................... G02B 6/0031 313/501 |
| 2015/0009454 A1 | 1/2015 | Nagatani et al. |
| 2015/0176807 A1 | 6/2015 | Park et al. |
| 2016/0085109 A1* | 3/2016 | Baek ................. G02F 1/133308 362/607 |
| 2016/0223739 A1* | 8/2016 | Yoon .................... G02B 6/0085 |
| 2018/0023771 A1* | 1/2018 | Kim .................. G02F 1/133611 362/84 |
| 2018/0023784 A1* | 1/2018 | Tamura ............. G02F 1/133611 362/235 |
| 2020/0159078 A1* | 5/2020 | Watanabe ......... G02F 1/133606 |
| 2020/0183234 A1* | 6/2020 | Kim .................. G02F 1/133605 |

FOREIGN PATENT DOCUMENTS

| | | |
|---|---|---|
| EP | 3279548 A1 | 2/2018 |
| TW | 200818240 A | 4/2008 |
| TW | 200837995 A | 9/2008 |
| TW | 200930792 A | 7/2009 |
| TW | I390302 B1 | 3/2013 |
| TW | I457663 B | 10/2014 |
| TW | I561770 B | 12/2016 |
| TW | I564769 B | 1/2017 |

OTHER PUBLICATIONS

Taiwanese Office Action, Taiwan Patent Application No. 108144375, dated Nov. 23, 2020, six pages.

* cited by examiner (a)

(b)

BACKLIGHT UNIT WITH LIGHT-MODIFYING PORTION AND DISPLAY INCLUDING THE SAME

CROSS REFERENCE TO RELATED APPLICATIONS

This application claims priority from Republic of Korea Patent Application No. 10-2018-0163499, filed on Dec. 17, 2018, and Republic of Korea Patent Application No. 10-2019-0133034, filed on Oct. 24, 2019, all of which are hereby incorporated by reference for all purposes as if fully set forth herein.

BACKGROUND

1. Field of the Disclosure

Embodiments of the present disclosure relate to a backlight unit and a display device including the same.

2. Description of the Related Art

As a society develops into an information society, demand is increasing for display devices for displaying images, and various types of display devices such as liquid crystal display devices, organic light-emitting display devices, and the like are being utilized.

A display device includes a backlight unit, and is able to display an image corresponding to light emitted from the backlight unit. Such a display device uses a light-emitting diode (LED), a cold cathode fluorescent lamp (CCFL), a hot cathode fluorescent lamp (HCLF), or the like as a light source of the backlight unit. In recent years, light-emitting diodes having excellent light efficiency and high color reproducibility have been widely used as light sources for backlight units.

The backlight units may be classified into an edge-type or a direct-type depending on the arrangement of a light source and a light transmission form. In the direct-type backlight unit, a light source such as an LED may be disposed on the rear side of the display device. The light source device used in such a direct-type backlight unit may include a light-emitting diode, and a substrate on which the light-emitting diode is mounted and which includes a circuit element for driving the light-emitting diode or the like.

In recent years, demand is increasing for display devices used in smart phones, tablet PCs, and the like to be light in weight, low in power consumption, and high in optical efficiency.

SUMMARY

Embodiments of the present disclosure provide a backlight unit capable of improving image quality and a display device including the backlight unit.

Embodiments of the present disclosure provide a backlight unit having high optical efficiency and a display device including the backlight unit.

According to embodiments of the present disclosure, it is possible to provide a backlight unit capable of improving image quality and a display device including the backlight unit.

In various embodiments, a display device comprises a display panel and a backlight unit. The backlight unit comprises a substrate; a phosphor film on the substrate; a plurality of light-emitting devices on the substrate between the substrate and the phosphor film, the plurality of light-emitting devices emitting light, a part of the emitted light traveling along a first path that passes through the phosphor film and another part of the emitted light traveling along a second path that bypasses the phosphor film; and a light-modifying portion in the second path to modify a color of the other part of the emitted light so that the modified color is closer to a color of the part of the light through the phosphor film than a color of the emitted light at the plurality of light-emitting devices.

In an embodiment, the display device further comprises a cover bottom under the backlight unit, and a guide panel on the cover bottom and onto which the display panel is mounted, a gap present between the guide panel and the phosphor film, the guide panel configured to reflect the other part of the emitted light traveling along the second path.

In an embodiment, the guide panel includes a surface facing the substrate, the light-modifying portion physically contacting the surface.

In an embodiment, the light-modifying portion is above the phosphor film.

In an embodiment, the light-modifying portion physically contacts the cover bottom.

In an embodiment, the light-modifying portion physically contacts the guide panel and the substrate.

In an embodiment, the light-modifying portion is between the substrate and the phosphor film.

In an embodiment, the light-modifying portion is on a same plane as the plurality of light-emitting devices.

In various embodiments, a display device comprises a display panel and a backlight unit. The backlight unit comprises a substrate; a plurality of light-emitting devices on the substrate; an adhesive film on the plurality of light-emitting devices, and a light-modifying sheet on the adhesive film, the light-modifying sheet including a plurality of light-modifying patterns at least partially overlapping the plurality of light-emitting devices, the plurality of light-modifying patterns having one or more layers including a top layer on a surface of the light-modifying sheet facing the substrate, air gaps present between the one or more layers and the adhesive film.

In an embodiment, the one or more layers further includes a middle layer on a surface of the top layer facing the substrate, the top layer having a size greater than a size of the middle layer.

In an embodiment, the one or more layers further includes a bottom layer on a surface of the middle layer facing the substrate, the bottom layer having a size less than the size of the middle layer.

In an embodiment, the display device further comprises a resin disposed on the plurality of light-emitting devices, wherein the adhesive film bonds the light-modifying sheet to the resin and the air gaps are between the resin and the light-modifying sheet.

In an embodiment, the plurality of light-modifying patterns includes a light-modifying pattern overlapping a peripheral area of the substrate surrounding a central area of the substrate, and another light-modifying pattern overlapping the central area of the substrate, the one or more layers of the light-modifying pattern having a thickness greater than that of the one or more layers of the other light-modifying pattern.

In an embodiment, the plurality of light-modifying patterns includes a light-modifying pattern overlapping a peripheral area of the substrate surrounding a central area of the substrate, and another light-modifying pattern overlapping the central area of the substrate, the one or more layers of the light-modifying pattern having an area greater than that of the one or more layers of the other light-modifying pattern.

In an embodiment, the plurality of light-modifying patterns includes a set of light-modifying patterns overlapping a peripheral area of the substrate surrounding a central area of the substrate, and another set of light-modifying patterns overlapping the central area of the substrate, an interval between the set of light-modifying patterns less than another interval between the other set of light-modifying patterns.

In an embodiment, the display device further comprises a reflector disposed on the substrate, the reflector having a height greater than another height of the plurality of light-emitting devices.

In an embodiment, the reflector includes a plurality of holes in which each of the plurality of light-emitting devices is centered. In an embodiment, the holes are circular.

In an embodiment, the display device further comprises a phosphor film on the light-modifying sheet and a diffusion plate on the phosphor film.

In an embodiment, the display device further comprises one or more optical sheets on the diffusion plate.

In various embodiments, a backlight unit comprises a light-emitting unit including a plurality of light-emitting devices, a phosphor film disposed on the light-emitting unit, and a light-modifying portion disposed around the light-emitting unit and having a color.

In an embodiment, the light-modifying portion is disposed on a same plane as is the plurality of light-emitting devices.

In an embodiment, the light-modifying portion is disposed on a plane different from another plane on which the plurality of light-emitting devices is disposed.

In an embodiment, the light-emitting unit comprises a substrate having an area in which the plurality of light-emitting devices is arranged, the light-modifying portion being disposed around the area; and resin disposed in a space configured by an upper portion of the substrate and the light-modifying portion. In an embodiment, an upper face of the substrate is coated with a reflective film.

In an embodiment, the backlight unit further comprises a light modifying sheet between the phosphor film and the light-emitting unit, wherein the light modifying sheet comprises light-shielding patterns arranged at positions corresponding to the plurality of light-emitting devices.

In an embodiment, the backlight unit further comprises a guide panel comprising an upper face portion overlapping the light-modifying portion and a side face portion disposed on a side face of the light-emitting unit.

In various embodiments, a display device comprises a display panel and a backlight unit disposed below the display panel and configured to radiate light to the display panel. The backlight unit comprises a light-emitting unit including a plurality of light-emitting devices, a phosphor film disposed on the light-emitting unit, and a light-modifying portion disposed around the light-emitting unit and having a color.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
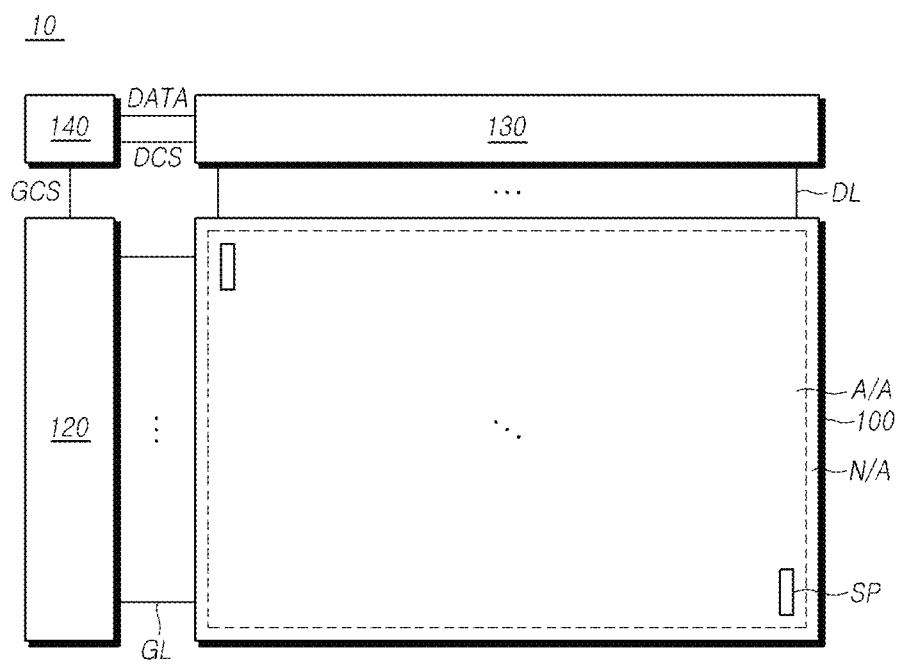
FIG. 1 is a structural diagram illustrating a display device according to embodiments of the present disclosure.

The advantages and features of the present disclosure and methods of achieving the same will be apparent by referring to embodiments of the present disclosure as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims.

The shapes, sizes, ratios, angles, numbers, and the like shown in the drawings for explaining embodiments of the present disclosure are illustrative, and therefore the present disclosure is not limited to the shown matters. Throughout the specification, the same or like reference numerals designate the same or like elements. Further, in the description of the present disclosure, when it is determined that the detailed description of the related well-known technologies unnecessarily make the subject matter of the present disclosure unclear, the detailed description will be omitted. When the expression "include", "have", "comprise", or the like as mentioned herein is used, any other part may be added unless the expression "only" is used. When an element is expressed in the singular, the element may cover the plural form unless a special mention is explicitly made of the element.

Further, in interpreting elements in embodiments of the disclosure, they should be construed to cover tolerance ranges even when explicit indications are not given separately.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element. When a positional relationship of two parts is described using, for example, "on . . . ", "above . . . ", "below . . . ", "beside . . . ", or the like, one or more other parts may be positioned between the two parts unless a term, such as "just" or "directly", is used.

In addition, components in embodiments of the present disclosure are not limited by these terms. These terms are only used to distinguish one component from another. Accordingly, when a constituent element is referred to as a first constituent element hereinafter, it may be a second constituent element within the technical idea of the present disclosure.

In addition, features (components) in embodiments of the present disclosure may be partly or wholly coupled or combined with each other or partly or may be wholly separated from each other, technically various interlocking and driving are possible, and respective embodiments may be implemented independently of each other or may be implemented in conjunction with each other.

Hereinafter, embodiments of the present disclosure will be described in detail with reference to the accompanying drawings.

FIG. 1 is a structural diagram illustrating a display device according to embodiments of the present disclosure.

Referring to FIG. 1, a display device 10 according to embodiments of the present disclosure may include a display panel 100 including an active area A/A and a non-active area N/A, a gate-driving circuit 120 for driving a display panel 100, a data-driving circuit 130, a controller 140, and the like.

Multiple gate lines GL and multiple data lines DL may be arranged in the display panel 100, and subpixels SP may be arranged in an area in which the gate lines GL and the data lines DL intersect each other. In addition, the display panel 100 may be a liquid crystal panel. The liquid crystal panel may include a pixel electrode, a common electrode, and a liquid crystal layer disposed between the pixel electrode and the common electrode. In the liquid crystal layer, molecular arrangements are changed in response to the application of a voltage to the pixel electrode and the common electrode so as to block or transmit light, thereby displaying an image.

The gate-driving circuit 120 is controlled by the controller 140 and sequentially outputs scan signals to the multiple gate lines GL disposed on the display panel 100 so as to control the driving timing of the multiple subpixels SP. The gate driving circuit 120 may include one or more gate driver integrated circuits (GDICs), and may be located only on one side of the display panel 100 or on opposite sides of the display panel 100 depending on the driving method thereof. Each GDIC may be connected to a bonding pad of the display panel 100 through a tape-automated-bonding (TAB) method or a chip-on-glass (COG) method, or may be implemented in a gate-in-panel (GIP) type so as to be directly disposed on the display panel 100. In some instances, the GDICs may be integrated and disposed on the display panel 100. In addition, each GDIC may be implemented by a chip-on-film (COF) type, which is mounted on a film connected to the display panel 100.

The data-driving circuit 130 may receive image data from the controller 140, and may convert the image data into an analog data voltage. The data drive circuit 130 outputs a data voltage to each of data lines DL in accordance with the timing of applying scan signals through the gate lines GL so that each subpixel SP is capable of expressing brightness according to the image data. The data-driving circuit 130 may include one or more source driver integrated circuits (SDICs). Each SDIC may include a shift register, a latch circuit, a digital-to-analog converter, and an output buffer. However, the SDIC is not limited thereto.

Each SDIC may be connected to a bonding pad of the display panel 100 by the TAB method or the COG method or may be directly disposed on the display panel 100. In some instances, each SDIC may be integrated and disposed in the display panel 100. In addition, each SDIC may be implemented in a chip-on-film (COF) type. In this case, each SDIC is may be mounted on a film connected to the display panel 100, and may be electrically connected to the display panel 100 through wirings on the film.

The controller 140 may supply various control signals to the gate-driving circuit 120 and the data-driving circuit 130, and may control the operations of the gate-driving circuit 120 and the data-driving circuit 130. The controller 140 may be mounted on a printed circuit board, a flexible printed circuit, or the like, and may be electrically connected to the gate-driving circuit 120 and the data-driving circuit 130 through the printed circuit board, the flexible printed circuit, or the like. The controller 140 may cause the gate-driving circuit 120 to output scan signals according to timing to be implemented in each frame, may convert image data received from the outside into a data signal format used by the data-driving circuit 130, and may output the converted image data to the data-driving circuit 130. The controller 140 may receive, from the outside (e.g., a host system), various timing signals including a vertical synchronous signal VSYNC, a horizontal synchronous signal HSYNC, an input data enable (DE) signal, and a clock signal CLK together with image data.

The controller 140 generates various control signals using various timing signals received from the outside, and may output various control signals to the gate-driving circuit 120 and the data-driving circuit 130. For example, in order to control the gate-driving circuit 120, the controller 140 may output various gate control signals GCSs including a gate start pulse (GSP), a gate shift clock (GSC), a gate output enable (GOE) signal, etc. Here, the GSP controls the operation start timing of one or more GDICs constituting the gate-driving circuit 120. The GSC is a clock signal commonly input to the one or more GDICs, and may control the shift timing of a scan signal. The GOE signal may designate the timing information of the one or more GDICs.

In addition, in order to control the data-driving circuit 130, the controller 140 may output various data control signals (DCSs) including a source start pulse (SSP), a source-sampling clock (SSC), a source output enable (SOE) signal, and the like. Here, the SSP may control the data-sampling start timing of one or more SDICs constituting the data-driving circuit 130. The SSC may be a clock signal for controlling the sampling timing of data in each of the SDICs. The SOE signal may control the output timing of the data-driving circuit 130.

The display device 10 may further include a power supply management IC configured to supply various voltages or currents to the display panel 100, the gate-driving circuit 120, the data-driving circuit 130, and the like, or to control various voltages or currents to be supplied.

Figure 2:
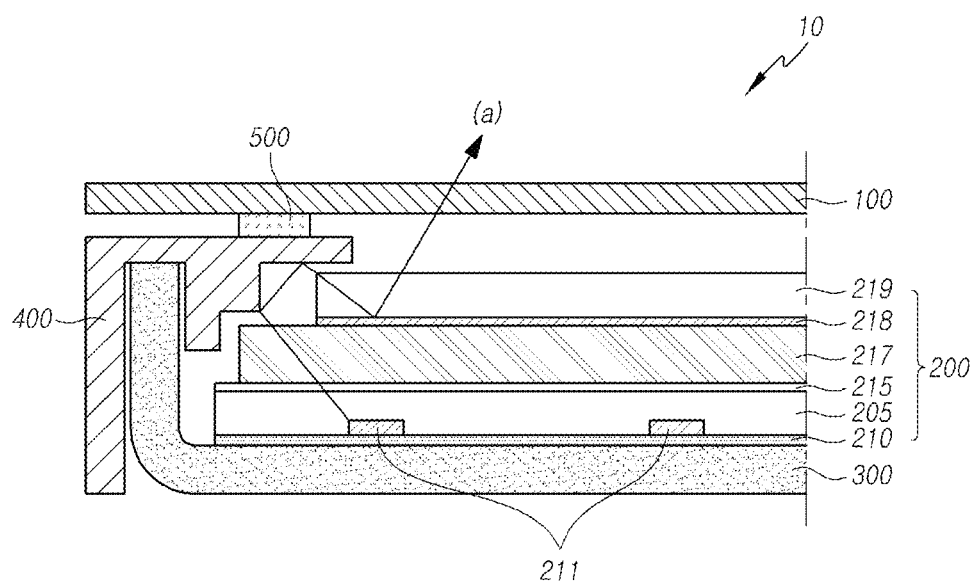
FIG. 2 is a view illustrating a display device according to embodiments of the present disclosure.

FIG. 2 is a view illustrating a display device according to embodiments of the present disclosure.

Referring to FIG. 2, the display device 10 according to the embodiments of the present disclosure may include a display panel 100, and a backlight unit 200 disposed below the display panel 100 and configured to supply light to the display panel 100.

Various structures may be disposed between the backlight unit 200 and the display panel 100. For example, the display panel 100 may be mounted on the backlight unit 200 via a guide panel 400, a foam pad 500, and the like, but the present disclosure is not limited thereto.

The backlight unit 200 may include a cover bottom 300 configured to accommodate optical elements and the like constituting the backlight unit 200.

A substrate 210 may be disposed on the cover bottom 300, and multiple light-emitting devices 211 may be disposed on the substrate 210. The light-emitting devices 211 may be, for example, light-emitting diodes (LEDs), or may be mini LEDs or micro LEDs. In addition, each of the light-emitting devices 211 may have a flip chip structure. The light-emitting devices 211, each of which has a flip chip structure, may be disposed in the form that chip-type light-emitting devices 211 are mounted on the substrate 210, so that it is possible to reduce the thickness of the backlight unit 200 and it is also possible to provide a light source having a wide radiation angle and high optical efficiency. In addition, a reflective film may be coated on the substrate 210. The reflective film may be formed of a white pigment. However, the reflective film is not limited thereto. The reflective film is capable of reflecting light radiated to the substrate 210, thereby enhancing optical efficiency. In addition, the reflector 212 illustrated in FIG. 6 and described below may be further disposed on the substrate 210.

The light-emitting devices 211 may emit light in a white wavelength band or, in some cases, may emit light in a specific wavelength band (e.g., a blue wavelength band). The substrate 210 may be a printed circuit board. In addition, resin layer 205 may be disposed on the substrate 210 on which multiple light-emitting devices 211 are disposed. The resin layer 205 may protect the multiple light-emitting devices 211, and may provide a function of diffusing the light emitted from the light-emitting devices 211.

A piece of adhesive film 215 may be disposed on the resin layer 205. The adhesive film 215 may be an optically clear adhesive (OCA) film. A diffusion plate 217 configured to diffuse light incident from below may be disposed on the adhesive film 215. In addition, a phosphor film 218 and an optical sheet 219 may be disposed on the diffusion plate 217. Here, each of the phosphor film 218 and the optical sheet 219 is shown as one layer, but is not limited thereto.

In the backlight unit 200 configured as described above, the radiation angle of the light emitted by the light-emitting devices 211 may approach 180 degrees. Among the light emitted from the light-emitting devices 211, the light having a path (a) may be reflected from a guide panel 400 to be radiated to the display panel 100 without passing through the phosphor film 218 disposed above the light-emitting devices 211. Due to such a problem, a color difference may be generated between the peripheral portion and the central portion of the display panel 100.

Figure 6:
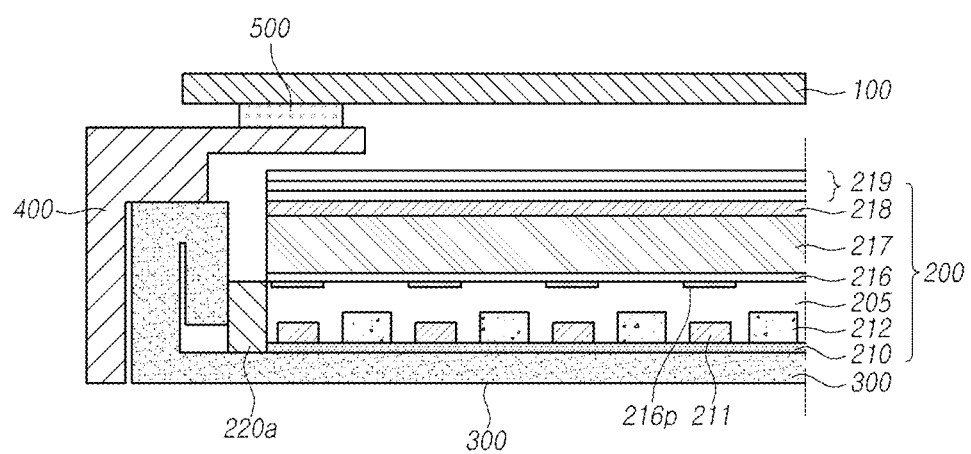
FIG. 6 is a cross-sectional view illustrating another embodiment of a display device including a backlight unit in which the substrate illustrated in FIG. 3 is employed.

Further, the backlight unit 200 may further include the light-modifying sheet illustrated in FIG. 6 below. The light-modifying sheet 216 is capable of scattering, reflecting, or diffracting the light radiated by the light-emitting devices 211. In addition, the light-modifying sheet 216 is capable of transmitting a part of the light radiated by the light-emitting devices 211. The light modifying sheet 216 may be a light control sheet capable of transmitting a part of light. The light-modifying sheet 216 may prevent the generation of hot spots in the backlight unit 200. The light-modifying sheet may include multiple light-modifying patterns 216p and the multiple light-modifying patterns 216p may be disposed at positions corresponding to the multiple light-emitting devices 211. The light-modifying patterns 216p illustrated in FIG. 6 are capable of scattering, reflecting, or diffracting the light emitted from the light-emitting devices 211. In addition, the light-modifying patterns 216p are capable of scattering, reflecting, or diffracting the light radiated by the light-emitting devices 211. In addition, the light-modifying patterns 216p are capable of transmitting a part of the light radiated by the light-emitting devices 211. The light-modifying patterns 216p may be a light control sheet capable of transmitting a part of light. The light radiated by the light-emitting devices 211 is scattered, reflected, diffracted, or transmitted by the light-modifying patterns 216p, thereby making the brightness of the backlight unit 200 more uniform.

That is, by arranging the light-modifying patterns 216p in an area where the intensity of the light emitted from the light-emitting devices 211 is greater (or greatest), it is possible to reduce brightness deviation between the area where the light-emitting devices 211 are disposed (an area having a greater amount of light) and the areas between the light-emitting devices 211 (areas having a smaller amount of light). The light-modifying sheet 216 may include a light-modifying material. In addition, the light-modifying pattern 216p may include titanium dioxide ($TiO_2$). In addition, the light-modifying material may be white. However, it is not limited thereto.

In addition, since the brightness deviation is reduced by the light-modifying sheet 216, it is possible to suppress the occurrence of mura in the peripheral area of the light emitting element 211 in the backlight unit 200. As a result, the luminance of light emitted from the backlight unit 200 may be uniform.

The diffusion plate 217 may be disposed on the light-modifying sheet 216 to diffuse light incident from the bottom. In addition, the phosphor film 218 and one or more optical sheets 219 may be disposed on the diffusion plate 217. In some embodiments, when the light incident on the phosphor film 218 is blue light, the light may be converted into white light when it passes through the phosphor film 218.

Figure 3:
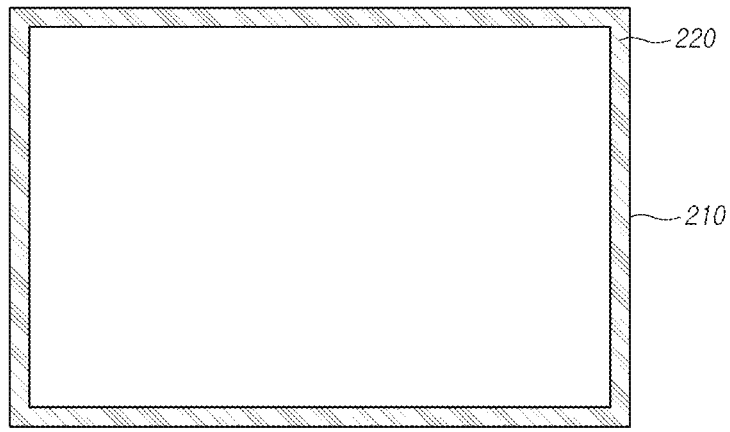
FIG. 3 is a plan view illustrating a substrate of a backlight unit according to an embodiment of the present disclosure.

FIG. 3 is a plan view illustrating a substrate of a backlight unit according to an embodiment of the present disclosure.

Referring to FIG. 3, the backlight unit 200 may include a substrate 210, and a light-modifying portion 220 may be disposed to correspond to the peripheral portion of the substrate 210. The light-modifying portion 220 may have a color. The peripheral portion of the substrate 210 may correspond to an area overlapping a guide panel 400 illustrated in FIG. 2. The light-modifying portion 220 includes phosphor, and the color of the light-modifying portion 220 may correspond to the color of the phosphor included in the light-modifying portion 220. The material causing the light-modifying portion 220 to have a color is not limited to the phosphor.

Here, the light-modifying portion 220 disposed on the peripheral portion of the substrate 210 may be in contact with the substrate 210 or may be spaced apart from the substrate 210 by a predetermined distance. Since the light-modifying portion 220 has a color, the light having the path (a) in FIG. 2 among the light emitted from the light-emitting devices 211 may be excited by the light-modifying portion 220 so as to have the color of the phosphor. That is, the color of light emitted from the light-emitting devices 211 and the color of the light-modifying portion 220 may be mixed. Therefore, it is possible to prevent or mitigate a color difference from being generated between the peripheral portion and the central portion of the display panel 100. The color of light rays passing through the light-modifying portion 220 may be closer to the color of light rays passing through the phosphor film 218 than the color of light rays emitted by the light-emitting devices 211 (that have not yet passed through either the light-modifying portion 220 or the phosphor film 218). In some embodiments, the color of the light-modifying portion 220 matches a color of the phosphor film 218.

Figure 4:
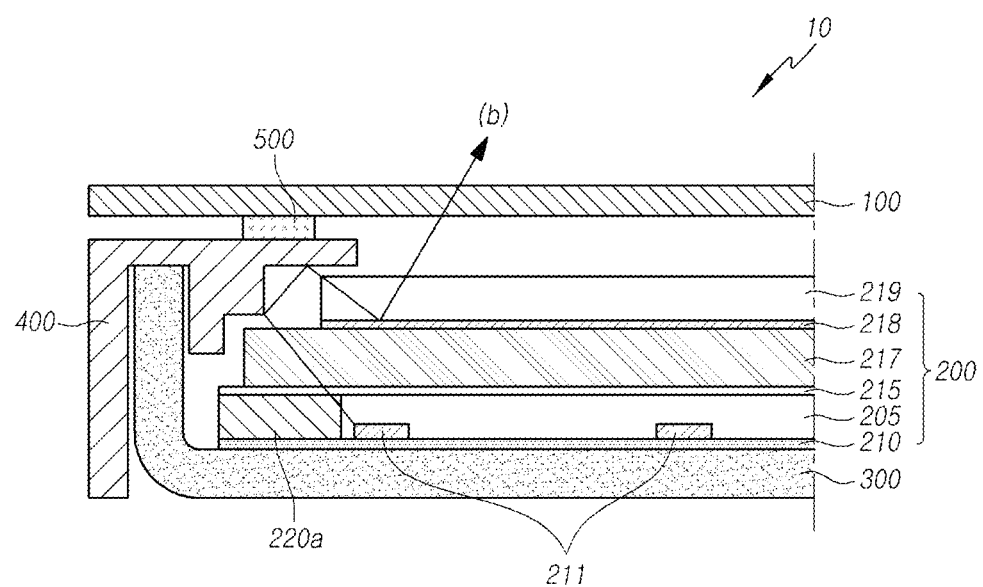
FIG. 4 is a cross-sectional view illustrating an embodiment of a display device including a backlight unit in which the substrate illustrated in FIG. 3 is employed.
Figure 5:
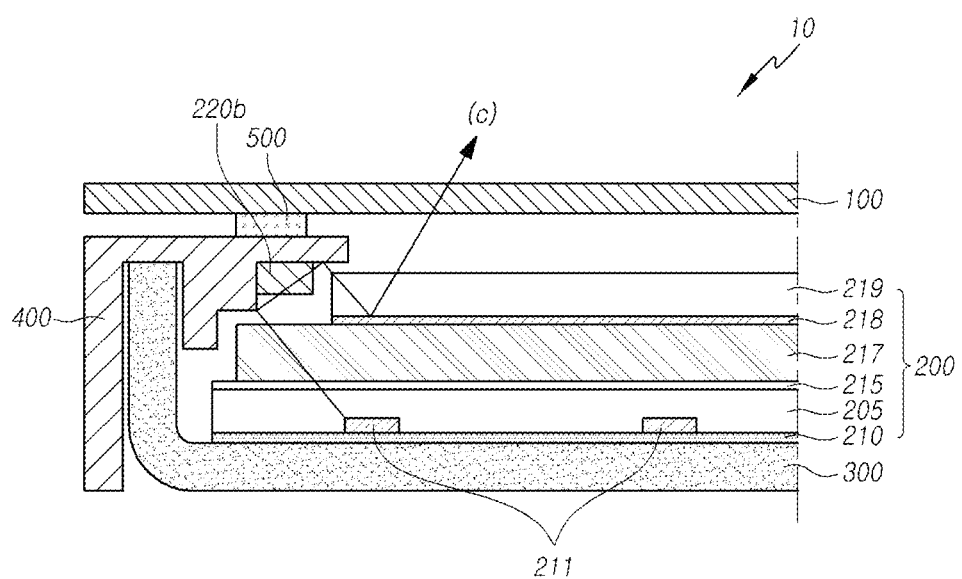
FIG. 5 is a cross-sectional view illustrating another embodiment of a display device including a backlight unit in which the substrate illustrated in FIG. 3 is employed.

FIG. 4 is a cross-sectional view illustrating an embodiment of a display device including a backlight unit in which the substrate illustrated in FIG. 3 is employed, and FIG. 5 is a cross-sectional view illustrating another embodiment of a display device including a backlight unit in which the substrate illustrated in FIG. 3 is employed.

Referring to FIG. 4, the substrate 210 may be disposed on the cover bottom 300, and the light-emitting devices 211 may be disposed on the substrate 210. In addition, a light-modifying portion 220a may be disposed on the substrate 210 at a position adjacent to the guide panel 400, but not physically contacting the guide panel 400. The light-modifying portion 220a may be disposed on the same plane as the light-emitting devices 211. After the light-modifying portion 220a is disposed, the resin layer 205 may disposed in the space configured by the light-modifying portion 220a and the substrate 210 and may be cured. Thus, the light-modifying portion 220a may function as a dam to prevent uncured resin layer 205 from leaking or overflowing outside the substrate 210. A piece of adhesive film 215 may be disposed on the resin layer 205. The adhesive film 215 may be an OCA film. A diffusion plate 217 configured to diffuse light incident from below may be disposed on the adhesive film 215. In addition, a phosphor film 218 may be disposed on the diffusion plate 217. In addition, an optical sheet 219 may be disposed on the phosphor film 218. Here, although the phosphor film 218 is shown as being disposed on the diffusion plate 217, the present disclosure is not limited thereto and the diffusion plate 217 may be disposed on the phosphor film 218. In addition, the guide panel 400 may guide the position where the display panel 100 is disposed on the backlight unit 200.

The light having the path (b) generated from the light-emitting devices 211 may be reflected by the guide panel 400 after passing through the light-modifying portion 220a. Therefore, light may be excited by the light-modifying portion 220a even if the light does not pass through the phosphor film 218, thereby preventing or mitigating a color difference from being generated between the peripheral portion and the central portion of the display panel 100.

Referring to FIG. 5, the light-modifying portion 220b may be disposed to come into contact with the inside of the guide panel 400, unlike FIG. 4. The light-modifying portion 220b may be disposed on a plane different from the substrate 210. In addition, the light-modifying portion 220b may be spaced apart from the substrate 210 above the substrate 210 by a predetermined distance. In addition, the light generated from the light-emitting devices 211 and having a path (c) may be reflected from the guide panel 400 and may then pass through the light-modifying portion 220b. Therefore, light may be excited by the light-modifying portion 220b even if the light does not pass through the phosphor film 218, thereby preventing or mitigating a color difference from being generated between the peripheral portion and the central portion of the display panel 100. Here, the light-modifying portions 220a and 220b shown in FIGS. 4 and 5, respectively, may be disposed on the substrate 210 or disposed inside of the guide panel 400. However, this disclosure is not limited thereto. The light-modifying portions 220a and 220b may be disposed together on the substrate 210 and inside of the guide panel 400. When the light-modifying portions 220a and 220b may be disposed together on the substrate 210 and inside of the guide panel 400, the light-modifying portion disposed on the substrate 210 may or may not include phosphor. In addition, the resin layer 205 may be cured after the resin layer 205 is disposed in the space configured by the substrate 210 and the light-modifying portion 220b.

FIG. 6 is a cross-sectional view illustrating another embodiment of the structure of a display device including a backlight unit in which the substrate illustrated in FIG. 3 is employed.

Referring to FIG. 6, the display device 10 according to embodiments of the present disclosure may include a display panel 100, and a backlight unit 200 disposed below the display panel 100 and configured to supply light to the display panel 100.

Various structures may be disposed between the backlight unit 200 and the display panel 100. For example, the display panel 100 may be fixed to the backlight unit 200 via a guide panel 400, a foam pad 500, and the like, but the present disclosure is not limited thereto.

The backlight unit 200 may include a cover bottom 300 configured to accommodate optical elements and the like constituting the backlight unit 200.

A substrate 210 may be disposed on the cover bottom 300, and multiple light-emitting devices 211 may be disposed on the substrate 210. The light-emitting devices 211 may be, for example, light-emitting diodes (LEDs), or may be mini LEDs or micro LEDs. In addition, the light-emitting devices 211 may be disposed in the form that chip-type light-emitting devices 211 are mounted on the substrate 210, so that it is possible to reduce the thickness of the backlight unit and it is also possible to provide a light source having a wide radiation angle and high optical efficiency. A chip-type light-emitting device 211 configured to be mounted on a substrate 210 may be referred to a light-emitting device 211 having a flip chip structure.

The light-emitting devices 211 may emit light in a white wavelength band or, in some cases, may emit light in a specific wavelength band (e.g., a blue wavelength band). The substrate 210 may be a printed circuit board, and a reflector 212 may be disposed on at least a portion of the area in which the light-emitting devices 211 are not disposed on the substrate 210. The resin layer 205 may be disposed on the multiple light-emitting devices 211 and the reflector 212. The resin layer 205 may protect the multiple light-emitting devices 211, and may provide a function of diffusing the light emitted from the light-emitting devices 211.

A light-modifying sheet 216 may be disposed on the resin layer 205. The light-modifying sheet 216 may include multiple light-modifying patterns 216p disposed on a face that faces the light-emitting devices 211. Here, the multiple light-modifying patterns 216p may be disposed at positions corresponding to the multiple light-emitting devices 211 on the lower face of the light-modifying sheet 216. The light-modifying patterns 216p includes one or more layers that are capable of scattering, reflecting, or diffracting the light emitted in the vertical (or approximately vertical) direction from the light-emitting devices 211, thereby improving the image quality of the backlight unit 200.

That is, by arranging the light-modifying patterns 216p in the area where the intensity of the light emitted from the light-emitting devices 211 is highest, it is possible to reduce brightness deviation between the area where the light-emitting devices 211 are disposed (an area having a greater amount of light) and the areas between the light-emitting devices 211 (areas having a smaller amount of light). The light modifying sheet 216 may include a light modifying material. In addition, the light modifying pattern 216p may include titanium dioxide ($TiO_2$). In addition, the light modifying material may be white. However, it is not limited thereto.

In addition, since the brightness deviation is reduced by the light modifying sheet 216, it is possible to suppress the occurrence of mura in the peripheral area of the light emitting devices 211 in the backlight unit 200. As a result, the luminance of light emitted from the backlight unit 200 may be uniform.

A diffusion plate 217 configured to diffuse light incident from below may be disposed on the light-modifying sheet 216. In addition, a phosphor film 218 or one or more optical sheets 219 may be disposed on the diffusion plate 217. In some embodiments, when the light incident on the phosphor film 218 is blue light, the light may be converted into white light when it passes through the phosphor film 218.

In addition, a light-modifying portion 220a may be disposed on the side faces of the resin layer 205. The light-modifying portion 220a may function as a dam to prevent uncured resin layer 205 from leaking or overflowing outside the substrate 210. The light-modifying portion 220a may include phosphor. The light emitted from the light-emitting devices 211 may be reflected by the cover bottom 300 or the like and may be radiated to the display panel 100 without passing through the phosphor film 218 disposed above the resin layer 205. Such light passes through the light-modifying portion 220a. When the light-modifying portion 220a includes phosphor, even if the light emitted from the light-emitting devices 211 does not pass through the phosphor film 218, color mixture may occur by the light-modifying portion 220a. Therefore, it is possible to prevent a color difference from being generated between the peripheral portion and the central portion of the display panel 100.

FIGS. 7A to 7E are views each illustrating an example of a specific structure of the backlight unit illustrated in FIG. 2.

Figure 7A:
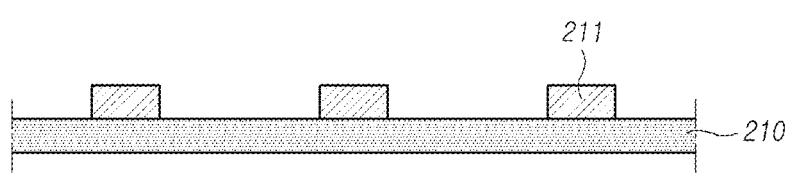
FIGS. 7A, 7B, 7C, 7D, and 7E are views each illustrating an example of a specific structure of the backlight unit illustrated in FIG. 6.

Referring to FIG. 7A, multiple light-emitting devices 211 may be disposed on the substrate 210. A reflective film coated on the substrate 210 may be disposed. The coated reflective film may be formed of a white pigment. That is, a white pigment may be applied to the substrate 210.

Figure 7B:
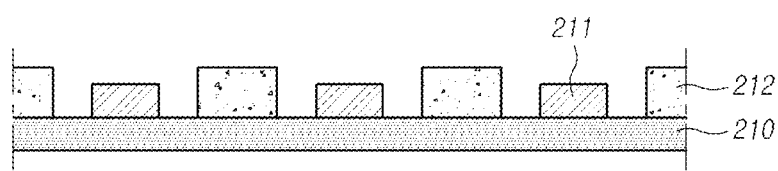

Referring to FIG. 7B, a reflector 212 may be disposed on at least a part of an area, except for the area where the light-emitting devices 211 are disposed on the substrate 210.

The reflector 212 may have a shape in which areas corresponding to the light-emitting devices 211 are open, and may be securely disposed on the substrate 210. The reflector 212 is able to reflect the light emitted from the light-emitting devices 211 to the front face of the backlight unit (facing the display panel 100), thereby enhancing the optical efficiency of the backlight unit.

Here, when the light-emitting devices 211 are disposed in the form of chips, the height of the reflector 212 may be greater than the height of the light-emitting devices 211 since the size of the light-emitting devices 211 is small.

Therefore, the light emitted in the lateral directions of the light-emitting devices 211 is able to be reflected by the side faces of the openings in the reflector 212 and may be emitted to the front face of the backlight unit 200, thereby further enhancing the optical efficiency of the backlight unit 200.

Figure 7C:
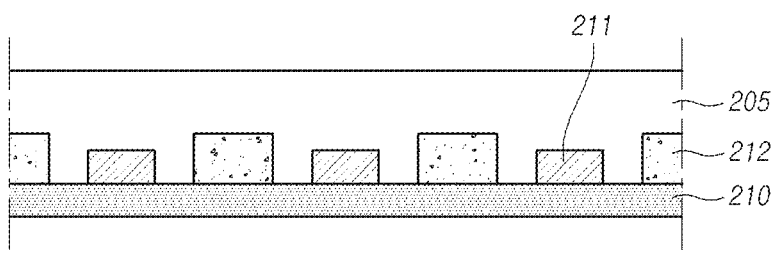

Referring to FIG. 7C, the resin layer 205 may be disposed on the multiple light-emitting devices 211 and the reflector 212. The resin layer 205 may include, for example, a resin. The resin layer 205 may be provided by disposing a partition outside the substrate 210 or outside the area in which the multiple light-emitting devices 211 are disposed, and applying the resin inside the partition. The resin layer 205 functions to protect the multiple light-emitting devices 211 disposed on the substrate 210, and may provide the function of a light guide plate by diffusing the light emitted from the light-emitting devices 211. The light emitted from the light-emitting devices 211 may spread by the resin layer 205 to the upper face of the resin layer 205 more evenly. At this time, even if the spreading direction of light is modified by the reflector 212, the resin layer 205, or the like, the intensity of the light emitted in the vertical direction of the light emitting devices 211 may be high, and thus the uniformity of image may be deteriorated.

According to the embodiments of the present disclosure, it is possible to improve the uniformity of image while reducing the thickness of the backlight unit 200 by disposing light-modifying patterns 216p having an optical characteristic such as scattering, reflection, and diffraction at the positions corresponding to the light-emitting devices 211 on the resin layer 205.

Figure 7D:
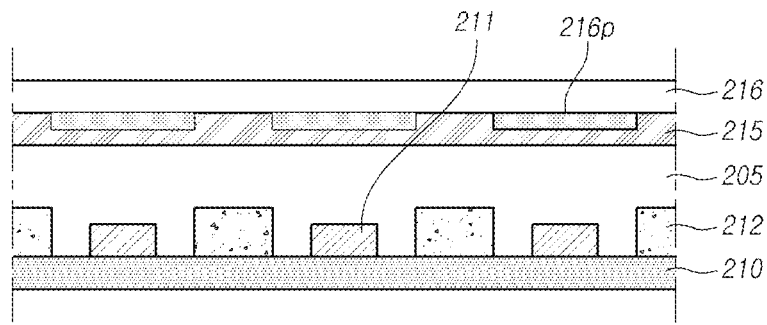

Referring to FIG. 7D, a light-modifying sheet 216 may be disposed on the resin layer 205, and the multiple light-modifying patterns 216p may be disposed on the lower face of the light-modifying sheet 216. However, this disclosure is not limited thereto, and the multiple light-modifying patterns 216p may be disposed on the upper surface of the light-modifying sheet 216. The light-modifying sheet 216 may be bonded to the resin layer 205 through a piece of adhesive film 215. The adhesive film 215 may be an OCA film. The light-modifying sheet 216 may be made of, for example, PET or the like, but is not limited thereto. Each of the multiple light-modifying patterns 216p disposed on the lower surface of the light-modifying sheet 216 may be arranged to correspond to one of the multiple light-emitting devices 211 disposed on the substrate 210. For example, the light-modifying patterns 216p may be disposed to be at least partially overlap the light-emitting devices 211, and in consideration of the light diffusion characteristics, may be disposed to overlap an area including the area in which the light-emitting devices 211 are disposed. The light-modifying patterns 216p may scatter, reflect, diffract, or transmit the light emitted from the light-emitting devices 211. For example, the light-modifying patterns 216p may scatter light emitted from the light-emitting devices 211 so as to allow the light to be emitted from the light-modifying sheet 216. In addition, the light-modifying patterns 216b may reflect the light emitted from the light emitting devices 211 in the vertical direction and may cause the light to be reflected again by the reflector 212, so that the light is emitted to the areas between the light-emitting devices 211 or between the light-modifying patterns 216b.

As described above, by scattering, reflecting, diffracting, or transmitting the emitted direction of the light emitted from the light-emitting devices 211 by the light-modifying patterns 216p, it is possible to improve the image quality of the backlight unit.

Figure 7E:
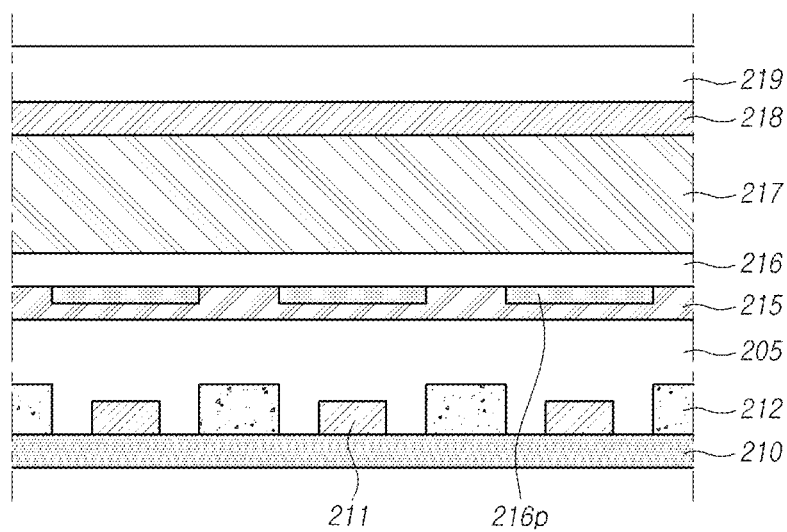

Referring to FIG. 7E, a diffusion plate 217 may be disposed on the light-modifying sheet 216, and a phosphor film 218 may be disposed on the diffusion plate 217. Then, at least one optical sheet 219 may be disposed on the phosphor film 218. Here, the positions where the diffusion plate 217 and the phosphor film 218 are disposed may be mutually exchanged. The diffusion plate 217 can diffuse the light emitted through the light-modifying sheet 216.

The phosphor film 218 may include phosphor having a specific color, and may excite incident light to emit light in a specific wavelength band. Accordingly, the light passing through the phosphor film 218 may have a specific color included in the phosphor film 218 or a color mixed with the specific color. For example, in the case in which the light-emitting devices 211 emit light in a first wavelength band (e.g., blue light), the phosphor film 218 may emit light in a second wavelength band (e.g., green light) and light in a third wavelength band (e.g., red light) in response to the light incident thereon. Therefore, in the case in which the light-emitting devices 211 emit blue light, when the blue light passes through the phosphor film 218, the blue light may be converted and emitted as white light.

As another example, the phosphor included in the phosphor film 213 may be yellow, green-red, or yellow-red.

Accordingly, in the case in which the light-emitting devices 211 emit blue light, when the blue light passes through the phosphor film 218, the blue light may be mixed with the color of the phosphor and may be converted and emitted as white light.

In some cases, the phosphor film 218 may be disposed in a partial area on the diffusion plate 217. For example, when the light-emitting devices 211 emit light in a blue wavelength band, the phosphor film 218 may be disposed only in an area other than an area corresponding to the area in which the blue subpixels SP are arranged in the display panel 100. That is, it is possible to cause light, which has not passed through the phosphor film 218, to reach the blue subpixels SP of the display panel 100. In addition, the phosphor film 218 may not be disposed along the light-emitting devices 211. For example, when the light-emitting devices 211 emit light in a white wavelength band or are coated with a color conversion film, which emits light in a green wavelength band and light in a red wavelength band, on the emission faces thereof, the phosphor film 218 may not be disposed.

As described above, embodiments of the present disclosure can improve the image quality of the backlight unit while reducing the thickness of the backlight unit by providing the light-modifying sheet 216 including the light-modifying patterns 216p disposed at the positions corresponding to the light-emitting devices 211 and various optical elements.

Hereinafter, embodiments of the present disclosure will be described with specific examples of the light-modifying patterns 216p disposed on the light-modifying sheet 216.

Figure 8:
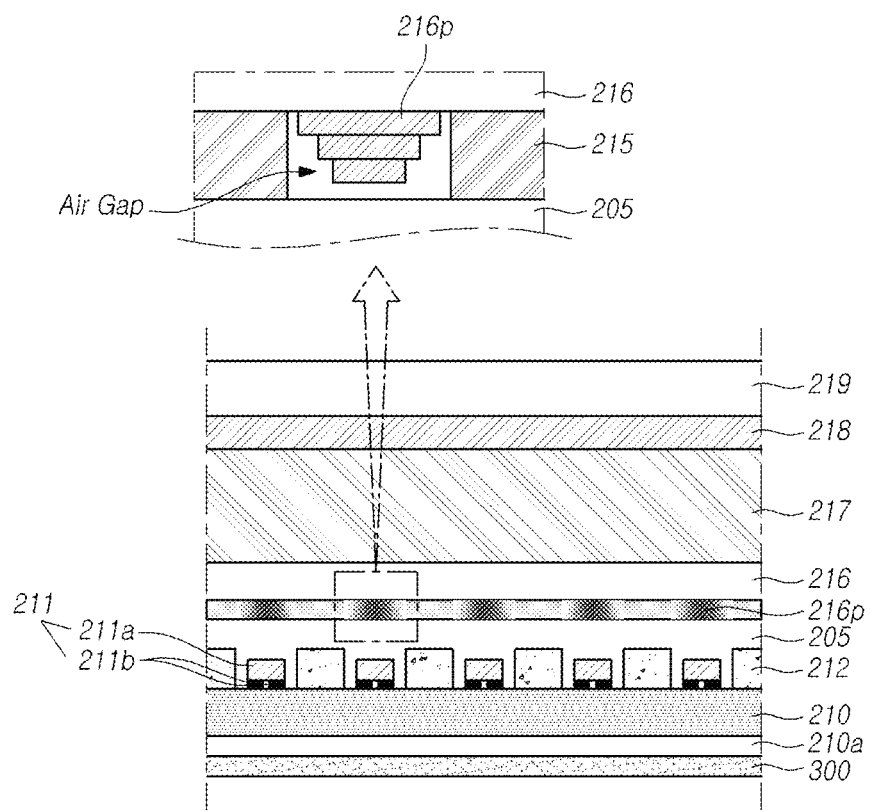
FIG. 8 is a view illustrating in detail the structures of a light-emitting device and a light-modifying sheet employed in the backlight unit illustrated in FIG. 6.

FIG. 8 is a view illustrating a structure of a backlight unit according to embodiments of the present disclosure.

Referring to FIG. 8, a substrate 210 may be disposed on a cover bottom 300 and the substrate 210 may be bonded to the cover bottom 300 by the adhesive tape 210a disposed between the cover bottom 300 and the substrate 210.

Multiple light-emitting devices 211 may be disposed on the substrate 210, and a reflector 212 may be disposed on at least a part of an area other than the area in which the light-emitting devices 211 are disposed on the substrate 211.

Here, each of the light-emitting devices 211 may be, for example, an LED, and may include a light-emitting portion 203a including an n-type semiconductor layer, an activation layer, and a p-type semiconductor layer, and an electrode portion 203b. Resin layer 205 may be disposed on the multiple light-emitting devices 211 and the reflector 212. A light-modifying sheet 216 on which the light-modifying patterns 216p are disposed at the positions corresponding to the light-emitting devices 211 may be disposed on the resin layer 205. Then, a diffusion plate 217, a phosphor film 218, an optical sheet 219, and the like may be disposed on the light-modifying sheet 216.

The light-modifying patterns 216p disposed on the lower face of the light-modifying sheet 216 may be implemented by printing a substance having a light-modifying property on the light-modifying sheet 216. For example, the light-modifying patterns 216p may be disposed through a method of printing $TiO_2$ ink on the light-modifying sheet 216. In addition, the light-modifying patterns 216p disposed on the lower face of the light-modifying sheet 216 may be arranged in one layer, or may be arranged in a multi-layer structure. That is, as illustrated in FIG. 4, the light-modifying patterns 216p disposed on the lower surface of the light-modifying sheet 216 may be configured in three layers. The light-modifying patterns 216p may be implemented through a method of printing the light-modifying substance three times on the light-modifying sheet 216, and the area of the light-modifying substance to be printed may become gradually narrower. Then, the light-modifying patterns 216p may be disposed on the light-emitting devices 211 by reversing and disposing the light-modifying sheet 216, on which the light-modifying patterns 216p are disposed, on the resin layer 205.

Therefore, the area of the light-modifying patterns 216p may gradually become narrower toward the bottom of the light-modifying sheet 216, and the thickness of each light-modifying pattern 216p may be larger in the central portion than in the outer (peripheral) portion thereof.

That is, since the intensity of light emitted in the vertical direction from the light-emitting device 211 is greater than intensity of light emitted in oblique or lateral directions, the central portion of the light-modifying pattern 216p may be configured to be thicker than the other portions. However, the present disclosure is not limited thereto.

By disposing the light-modifying patterns 216p on the light-emitting devices 211 as described above, it is possible to prevent or mitigate hot spots from appearing in the area in which the light-emitting devices 211 are disposed by scattering, reflecting, diffracting, or blocking a part of the light emitted in the vertical direction from the light-emitting devices 211. The light-modifying sheet 216 on which the light-modifying patterns 216p are disposed may be bonded to the resin layer 205 via the adhesive film 215. At this time, the adhesive film 215 may be disposed in at least a portion of an area other than the area in which the light-modifying patterns 216p are disposed on the lower face of the light-modifying sheet 216.

Therefore, the adhesive film 215 may not be disposed in the area in which the light-modifying patterns 216p are disposed, and an air gap may exist between the light-modifying patterns 216p and the resin layer 205. In addition, the side portions of the light-modifying patterns 216p and the adhesive film 215 may be spaced apart from each other. Since the air gap exists between the light-modifying patterns 216p and the resin layer 205, light emitted in the lateral direction of the light-modifying patterns 216p may be reflected by the air gap through the light-modifying sheet 216 and toward the display panel 100. That is, the light emitted in the lateral direction of the light-modifying patterns 216p may be emitted at a large refraction angle by the air layer having a low refractive index, or may be reflected by the air layer. Since light reflected by the air layer is emitted after being reflected again by the reflector 212, it is possible to enhance the optical efficiency while assisting the light-modifying function of the light-modifying patterns 216p.

As described above, it is possible to enhance the optical efficiency of the backlight unit while preventing or mitigating a hot spot through the structure in which the light-modifying patterns 216p and the air gap are arranged at the positions corresponding to the light-emitting devices 211. In addition, the light-modifying patterns 216p disposed on the lower surface of the light-modifying sheet 216 may be arranged in different structures depending on the positions in which they are disposed.

Figure 9A:
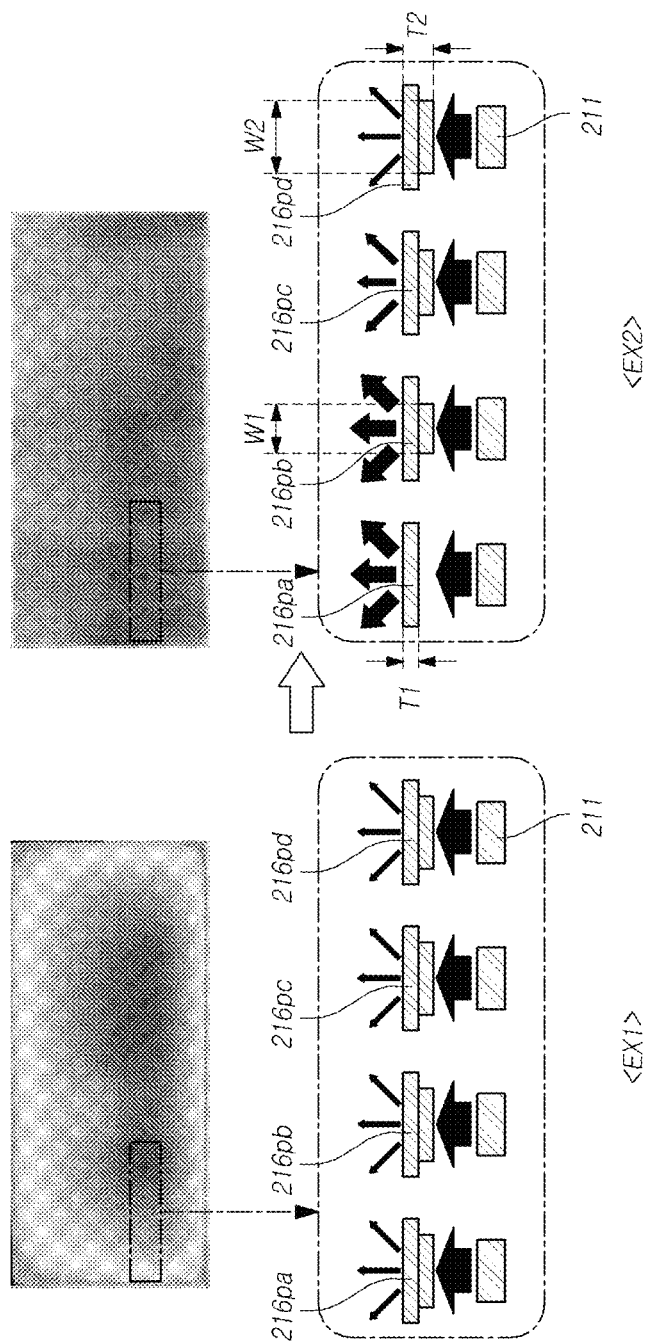
FIGS. 9A and 9B are views illustrating examples of structures according to positions of the light-modifying patterns included in the backlight unit illustrated in FIG. 8.
Figure 9B:
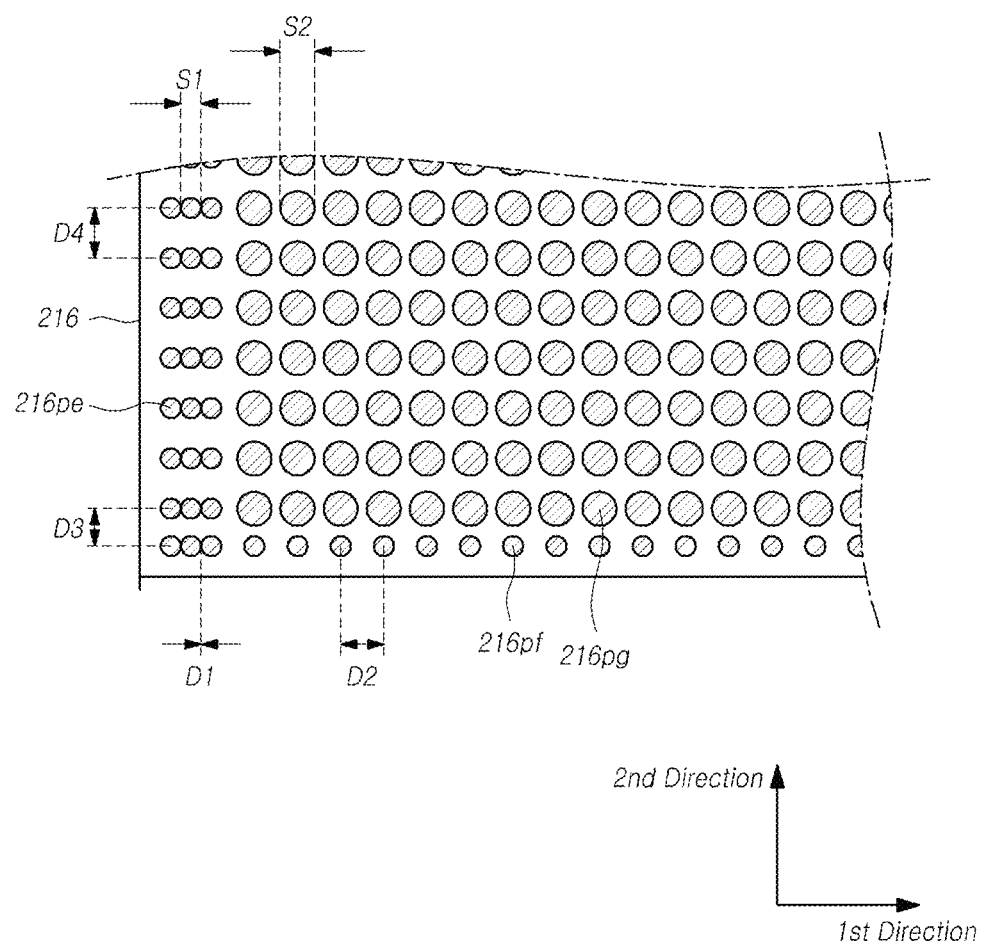

FIGS. 9A and 9B are views illustrating examples of structures according to positions of the light-modifying patterns included in the backlight unit illustrated in FIG. 8.

Referring to FIG. 9A, examples of brightness appearing through the backlight unit according to the structures of light-modifying patterns 216p are illustrated, in which EX1 illustrates an example of brightness measured when the light-modifying patterns 216p are arranged in a constant structure, and EX2 represents an example of brightness measured when the light-modifying patterns 216p are arranged in different structures depending on the positions thereof.

As illustrated in EX1 in FIG. 9A, when the structures of the light-modifying patterns 216pa disposed in an outer area of the backlight unit 200 and the light-modifying patterns 216pd disposed in the central area are the same (e.g., same thickness or size), the brightness of the outer (peripheral) area of the backlight unit may be lower than the brightness of the central area of the backlight unit.

That is, since, in the outer area of the backlight unit 200, the number of the light-emitting devices 211 that supply light to the corresponding area is relatively small in comparison to the central area, when the light-modifying patterns 216p having the same level of light-modifying characteristic is disposed, the brightness may be lower compared to the central area of the backlight unit.

Therefore, as illustrated in EX2 in FIG. 9A, by arranging the light-modifying patterns 216pa disposed in the outer area of the backlight unit 200 and the light-modifying patterns 216pd disposed in the central area of the backlight unit 200 to have different structures, it is possible to prevent the brightness of the outer area of the backlight unit 200 from being deteriorated and to make the overall brightness more uniform.

As an example, the light-modifying patterns 216p may be arranged such that the thickness T1 of the light-modifying patterns 216pa disposed in the outer area of the backlight unit 200 is smaller than the thickness T2 of the light-modifying patterns 216pd disposed in the central area.

Alternatively, the light-modifying patterns 216p may be arranged such that the area W1 of the thickest portion in the light-modifying pattern 216pb disposed adjacent to the outer area of the backlight unit 200 is smaller than the area W2 of the thickest portion in the light-modifying pattern 216pd. That is, in the light-modifying patterns 216pa and 216pb disposed in the outer area of the backlight unit 200 or in the area adjacent to the outer area, the area of the portion having a higher blocking characteristic is made smaller.

In addition, the light-modifying patterns 216p may be arranged such that that the thicknesses of the light-modifying patterns 216p gradually decrease from the central area toward the outer area of the backlight unit 200, or such that the area of the thickest portions of the light-modifying patterns 216p gradually decreases. That is, for the light-modifying patterns 216pa and 216pb disposed in the outer area or adjacent to the outer area of the backlight unit 200, the area of the portion having the high blocking characteristic be made smaller.

In addition, the thickness of the light-modifying patterns 216p gradually decreases from the central area of the backlight unit 200 to the outer area, or the area of the thickest part of the light-modifying patterns 216p gradually decreases.

In addition, in some cases, the light-modifying patterns 216p may be differently arranged such that the number or intervals of light-emitting devices 211 are different between the central area and the outer area of the backlight unit 200.

Referring to FIG. 9B, another example of the structure in which the light-modifying patterns 216p are disposed on the lower surface of the light-modifying sheet 216 is illustrated.

Here, the distance between the light-emitting devices 211 disposed in the outer area of the backlight unit 200 may be smaller than the distance between the light-emitting devices 211 disposed in the central area of the backlight unit 200. That is, the light-emitting devices 211 may be arranged in the structure in which the light-emitting devices 211 are disposed more densely in the outer area of the backlight unit 200 such that the brightness becomes uniform in the central area and the outer area of the backlight unit 200.

In addition, since the light-modifying patterns 216p disposed on the lower face of the light-modifying sheet 216 are arranged to correspond to the light-emitting devices 211, the interval between the light-modifying patterns 216p disposed in the outer area of the backlight unit 200 may be different from the interval between the light-modifying patterns 216p disposed in the central area.

As an example, the interval D1 in the first direction of the light-modifying patterns 216p disposed in the outer area of the backlight unit 200 may be smaller than the interval D2 in the first direction of the light-modifying patterns 216p disposed in the central area. In addition, the interval D3 in the second direction of the light-modifying patterns 216p disposed in the outer area of the backlight unit 200 may be smaller than the interval D4 in the second direction of the light-modifying patterns 216p disposed in the central area.

The size, thickness, and the like of the light-modifying patterns 216p disposed in the outer area of the backlight unit 200 may be different from the size, thickness, and the like of the light-modifying patterns 216p disposed in the central area of the backlight unit 200.

For example, as illustrated in FIG. 9B, the size S1 of the light-modifying patterns 216pe and 216pf disposed in the outer area of the backlight unit 200 may be smaller than the size S2 of the light-modifying patterns 216pg disposed in the central area of the backlight unit 200.

Alternatively, the light-modifying pattern 216p may have a multilayer structure as described above. In this case, the thickness of the light-modifying patterns 216pe and 216pf disposed in the outer area of the backlight unit 200 or the area of the portions having the largest thickness in the light-modifying patterns 216pe and 216pf may be smaller than the thickness of the light-modifying patterns 216pg disposed in the central area of the backlight unit or the area of the portions having the largest thickness in the light-modifying patterns 216pg.

That is, by reducing the sizes of the light-modifying patterns 216pe and 216pf disposed in the outer area of the backlight unit 200, the light-modifying patterns 216pe and 216pf may be disposed to correspond to the light-emitting devices 211 arranged at a small interval. As a result, it is possible to prevent or mitigate hot spots from being generated at the positions corresponding to the light-emitting devices 211 in the outer area of the backlight unit 200.

In addition, by lowering the level at which the light emitted from the light-emitting devices 211 is scattered, reflected, diffracted, or blocked in the outer area of the backlight unit 200, the amount of light to be emitted is increased and the brightness of the outer area of the backlight unit 200 is improved. Thus, it is possible to make the entire area of the display panel 200 exhibit more uniform brightness.

As described above, by arranging the light-modifying patterns 216p to have different structures from area to area in the backlight unit 200, it is possible to prevent or mitigate the brightness from being lowered in the outer area of the backlight unit 200 and to improve the uniformity of brightness.

In addition, it is possible to prevent or mitigate hot spots of the backlight unit 200 and to improve the uniformity of brightness through the structure in which the above-described light-modifying patterns 216p are disposed.

Embodiments of the present disclosure are also able to provide a method of improving the image quality of the backlight unit 200 while increasing the optical efficiency of the backlight unit 200 by diffracting light emitted in the vertical direction of the light-emitting devices 216p.

Figure 10:
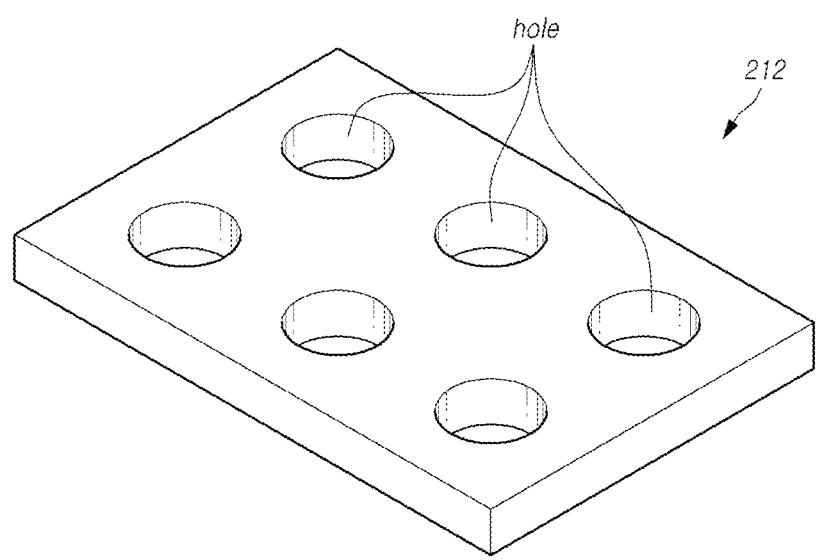
FIG. 10 is a perspective view illustrating an embodiment of a reflector employed in the backlight unit illustrated in FIG. 6.

FIG. 10 is a perspective view illustrating an embodiment of a reflector employed in the backlight unit illustrated in FIG. 6.

Referring to FIG. 10, the reflector 212 may be disposed to correspond to the substrate 210. The reflector 212 may include multiple holes. A light-emitting device may be disposed at the center of each hole. However, the present disclosure is not limited thereto. Here, although the shapes of the holes are illustrated as being circular, but the present disclosure is not limited thereto.

Figure 11:
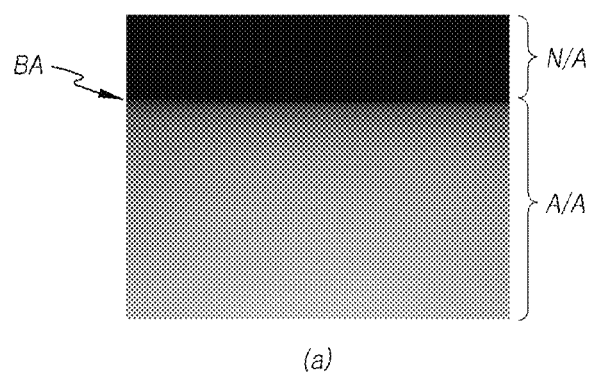
FIG. 11 includes views comparing the case in which a light-modifying portion is not disposed and the case in which a light-modifying portion is disposed according to an embodiment.
Figure 11:
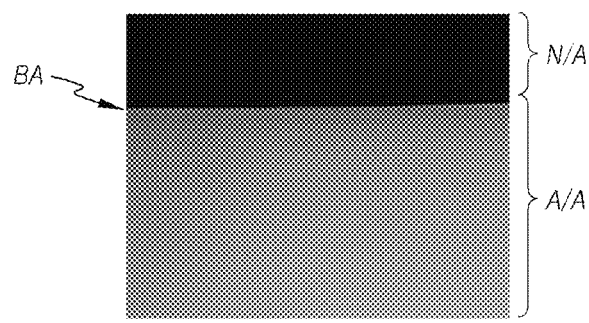

FIG. 11 includes views comparing the case in which a light-modifying portion is not disposed and the case where a light-modifying portion is disposed.

Referring to FIG. 11, in some embodiments, since the light emitted from the backlight unit 200 before passing through the display panel 100 has a higher color temperature than normal white light, the white light passing through the light conversion sheet 216 and the phosphor film 218 has a bluish color.

View (a) in FIG. 11 illustrates the case in which the light-modifying portion 220 illustrated in FIG. 3 is not disposed, in which a narrow strip is displayed at the boundary BA between a portion N/A covered by the guide panel 400 and a display portion A/A. In contrast, view (b) in FIG. 11 illustrates the case in which the light-modifying portion 220 is disposed, in which it can be seen that since no strip is displayed at the boundary BA between the portion NA of the guide panel 400 and the display portion A/A, the boundary BA clearly appears. That is, it can be seen that, by arranging the light-modifying portion 220 in correspondence with the peripheral portion of the substrate of the backlight unit 200, the image quality is prevented from being deteriorated due to the mixture of light in the display portion A/A.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A display device comprising:
a display panel;
a backlight unit comprising:
a substrate,
a phosphor film on the substrate,
a plurality of light-emitting devices on the substrate between the substrate and the phosphor film, the plurality of light-emitting devices emitting light, a part of the emitted light traveling along a first path that passes through the phosphor film and another part of the emitted light traveling along a second path that bypasses the phosphor film, and
a light-modifying portion in the second path to modify a color of the other part of the emitted light so that the modified color is closer to a color of the part of the light through the phosphor film than a color of the emitted light at the plurality of light-emitting devices;
a cover bottom under the backlight unit; and
a guide panel on the cover bottom and onto which the display panel is mounted, a gap present between the guide panel and the phosphor film, the guide panel configured to reflect the other part of the emitted light traveling along the second path, wherein the light-modifying portion physically contacts the cover bottom.

2. The display device of claim 1, wherein the light-modifying portion comprises a first light-modifying portion and a second light-modifying portion, wherein the second light-modifying portion physically contacts the guide panel and the first light-modifying portion physically contacts the substrate.

3. The display device of claim 1, wherein the guide panel includes a surface facing the substrate, the light-modifying portion physically contacting the surface.

4. The display device of claim 3, wherein the light-modifying portion is above the phosphor film.

5. A backlight unit comprising:
a light-emitting unit including a plurality of light-emitting devices;
a phosphor film disposed on the light-emitting unit;
a light-modifying portion disposed around the light-emitting unit and having a color; and
a light modifying sheet between the phosphor film and the light-emitting unit, wherein the light modifying sheet comprises light-shielding patterns arranged at positions corresponding to the plurality of light-emitting devices,
wherein the light-emitting unit comprises:
a substrate having an area in which the plurality of light-emitting devices is arranged, the light-modifying portion being disposed around the area; and
a resin disposed in a space configured by an upper portion of the substrate and the light-modifying portion.

6. A display device comprising:
a display panel; and
a backlight unit disposed below the display panel and configured to radiate light to the display panel,
wherein the backlight unit comprises:
a light-emitting unit including a plurality of light-emitting devices;

a phosphor film disposed on the light-emitting unit;
a light-modifying portion disposed around the light-emitting unit and having a color; and
a light modifying sheet disposed between the phosphor film and the light-emitting unit, wherein the light modifying sheet comprises light modifying patterns arranged at positions corresponding to the plurality of light-emitting devices, wherein the light-emitting unit comprises:
a substrate having an area in which the plurality of light-emitting devices is arranged, the light-modifying portion being disposed around the area; and
a resin disposed in a space configured by an upper portion of the substrate and the light-modifying portion.

7. A display device comprising:
a display panel;
a backlight unit comprising:
a substrate,
a phosphor film on the substrate,
a plurality of light-emitting devices on the substrate between the substrate and the phosphor film, the plurality of light-emitting devices emitting light, a part of the emitted light traveling along a first path that passes through the phosphor film and another part of the emitted light traveling along a second path that bypasses the phosphor film, and
a light-modifying portion in the second path to modify a color of the other part of the emitted light so that the modified color is closer to a color of the part of the light through the phosphor film than a color of the emitted light at the plurality of light-emitting devices;
a cover bottom under the backlight unit; and
a guide panel on the cover bottom and onto which the display panel is mounted, a gap present between the guide panel and the phosphor film, the guide panel configured to reflect the other part of the emitted light traveling along the second path, wherein the light-modifying portion physically contacts the cover bottom, and, wherein the light-modifying portion is between the substrate and the phosphor film.

8. The display device of claim 7, wherein the light-modifying portion is on a same plane as the plurality of light-emitting devices.

9. A display device comprising:
a display panel; and
a backlight unit comprising:
a substrate,
a plurality of light-emitting devices on the substrate,
an adhesive film on the plurality of light-emitting devices, and
a light-modifying sheet on the adhesive film, the light-modifying sheet including a plurality of light-modifying patterns at least partially overlapping the plurality of light-emitting devices, the plurality of light-modifying patterns having one or more layers including a top layer on a surface of the light-modifying sheet facing the substrate, air gaps present between the one or more layers and the adhesive film.

10. The display device of claim 9, wherein the one or more layers further includes:
a middle layer on a surface of the top layer facing the substrate, the top layer having a size greater than a size of the middle layer.

11. The display device of claim 10, wherein the one or more layers further includes:
a bottom layer on a surface of the middle layer facing the substrate, the bottom layer having a size less than the size of the middle layer.

12. The display device of claim 9, further comprising:
a resin disposed on the plurality of light-emitting devices, wherein the adhesive film bonds the light-modifying sheet to the resin and the air gaps are between the resin and the light-modifying sheet.

13. The display device of claim 9, wherein the plurality of light-modifying patterns includes:
a light-modifying pattern overlapping a peripheral area of the substrate surrounding a central area of the substrate; and
another light-modifying pattern overlapping the central area of the substrate, the one or more layers of the light-modifying pattern having a thickness greater than that of the one or more layers of the other light-modifying pattern.

14. The display device of claim 9, wherein the plurality of light-modifying patterns includes:
a light-modifying pattern overlapping a peripheral area of the substrate surrounding a central area of the substrate; and
another light-modifying pattern overlapping the central area of the substrate, the one or more layers of the light-modifying pattern having an area greater than that of the one or more layers of the other light-modifying pattern.

15. The display device of claim 9, wherein the plurality of light-modifying patterns includes:
a set of light-modifying patterns overlapping a peripheral area of the substrate surrounding a central area of the substrate; and
another set of light-modifying patterns overlapping the central area of the substrate, an interval between the set of light-modifying patterns less than another interval between the other set of light-modifying patterns.

16. The display device of claim 9, further comprising:
a reflector disposed on the substrate, the reflector having a height greater than height of the plurality of light-emitting devices.

17. The display device of claim 16, wherein the reflector includes a plurality of holes in which each of the plurality of light-emitting devices is centered.

18. The display device of claim 17, wherein the holes are circular.

19. The display device of claim 9, further comprising:
a phosphor film on the light-modifying sheet; and
a diffusion plate on the phosphor film.

20. The display device of claim 19, further comprising:
one or more optical sheets on the diffusion plate.

21. A backlight unit comprising:
a light-emitting unit including a plurality of light-emitting devices;
a phosphor film disposed on the light-emitting unit; and
a light-modifying portion disposed around the light-emitting unit and having a color,
wherein the light-emitting unit comprises:
a substrate having an area in which the plurality of light-emitting devices is arranged, the light-modifying portion being disposed around the area; and
a resin disposed in a space configured by an upper portion of the substrate and the light-modifying portion.

22. The backlight unit of claim 21, wherein the light-modifying portion is disposed on a same plane as is the plurality of light-emitting devices.

23. The backlight unit of claim 21, wherein the light-modifying portion is disposed on a plane different from another plane on which the plurality of light-emitting devices is disposed.

24. The backlight unit of claim 21, further comprising:
a guide panel comprising an upper face portion overlapping the light-modifying portion and a side face portion disposed on a side face of the light-emitting unit.

25. The backlight unit of claim 21, wherein an upper face of the substrate is coated with a reflective film.

26. A display device comprising:
a display panel; and
a backlight unit disposed below the display panel and configured to radiate light to the display panel, wherein the backlight unit comprises:
a light-emitting unit including a plurality of light-emitting devices;
a phosphor film disposed on the light-emitting unit; and
a light-modifying portion disposed around the light-emitting unit and having a color, wherein the light-emitting unit comprises:
a substrate having an area in which the plurality of light-emitting devices is arranged, the light-modifying portion being disposed around the area; and
a resin disposed in a space configured by an upper portion of the substrate and the light-modifying portion.

27. The display device of claim 26, wherein the light-modifying portion is disposed on a plane same as the plurality of light-emitting devices.

28. The display device of claim 26, wherein the light-modifying portion is disposed on a plane different from another plane on which the plurality of light-emitting devices is disposed.

29. The display device of claim 26, wherein an upper face of the substrate is coated with a reflective film.

\* \* \* \* \*